Figure 1:
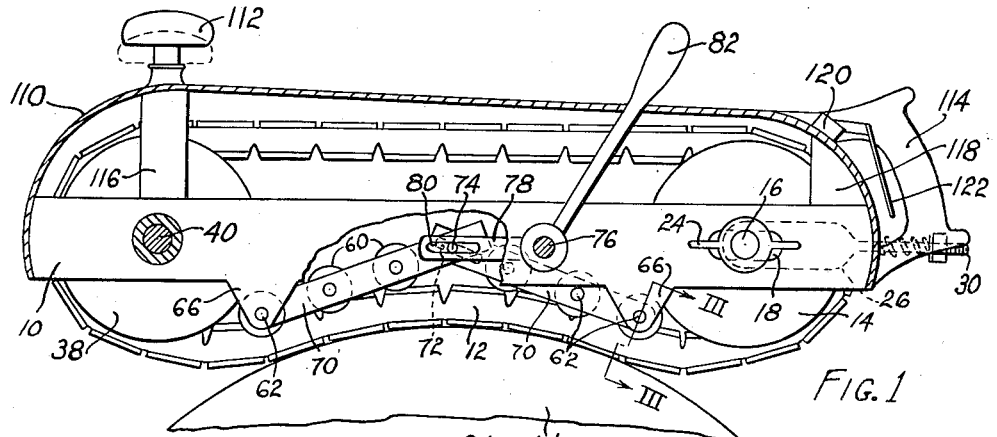

July 6, 1943. F. P. STULL 2,323,578

SURFACE FINISHING APPARATUS

Filed March 13, 1941

Inventor

FAYE P. STULL

AHOldham Attorney

Patented July 6, 1943

2,323,578

UNITED STATES PATENT OFFICE 2,323,578

SURFACE FINISHING APPARATUS

Faye P. Stull, Youngstown, Ohio

Application March 13, 1941, Serial No. 383,144

17 Claims. (Cl. 29—76)

This invention relates to apparatus for grinding, filing, polishing or finishing substantially any desired surface, particularly curved surfaces, and more specifically relates to portable apparatus for filing or finishing.

Heretofore, it has been proposed to provide portable apparatus for sanding, polishing or otherwise treating surfaces, with the apparatus including an endless belt driven by a flexible shaft, or by a prime mover mounted on the apparatus. Apparatus of this general type has met with some success but has not been satisfactory for many uses including operations on convexly or concavely curved surfaces. Moreover, a relatively skilled operator is ordinarily required to insure the proper type of finishing or surfacing operation without gouging, and to keep the machine from running away from the operator. The tendency for the driven endless belt to move the work or apparatus to or from the operator is only somewhat objectionable when the friction between the endless belt and the work is relatively small. However, when the friction is increased, as is the case with sanding or grinding machines the work either scoots out from under the tool, or the tool tends to pull itself along the surface of the work much to the annoyance of the operator.

When the friction between the belt and the work is still further increased as in the case of mounting sections of files on a belt, the tool becomes almost unmanageable, or very difficult and tiresome to employ. Thus, even though it has been proposed heretofore to mount sections of a file on an endless conveyor belt and rotate the belt to obtain a filing action, apparatus of this type has never been accepted commercially because of the various objections hereto, as outlined above. Further, file sections mounted on an endless chain or conveyor belt have resulted in chattering, and, also, a gouging of the corners or edges of the individual file sections into the work, all of which is highly undesirable. Likewise, power files as heretofore proposed have not been capable of operations on convexly or concavely curved surfaces and have been heavy and cumbersome and not adapted to portable operations.

As a result, filing and finishing operations of many types, including operations on automobile bodies, are still performed by hand today because there is no known or suitable apparatus to perform them. The hand operations are relatively expensive, time consuming, and laborious, for example, in the automobile repair industry in the straightening, smoothing and repair of automobile bodies and fenders.

It is the general object of my invention to avoid and overcome the foregoing and other difficulties of and objections to prior practices and apparatus by the provision of a relatively-inexpensive, readily-operated apparatus for quickly performing filing and finishing operations of substantially any character on a wide variety of materials and surfaces including convexly or concavely curved surfaces.

Another object of my invention is to provide an apparatus of the character described which is of a self-contained, portable character, and in which the forces tending to move the work and tool relatively with respect to each other during the filing or finishing operation are substantially counterbalanced.

Another object of my invention is the provision of portable power filing or finishing apparatus including a plurality of endless belts driven in opposite and counterbalancing directions.

Another object of my invention is to provide a tool of the character described and capable of being used to finish a surface right up to the line of joinder of the surface with another surface at an angle to the first.

Another object of my invention is the provision of a power file in which an endless V-belt, or a plurality of them are employed, and in which chattering of the belt and gouging and marring of the work are substantially prevented.

Another object of my invention is to provide an endless flexible file of a novel character and construction.

Another object of my invention is the provision of portable filing and finishing apparatus including safety means whereby the tool cannot be operated until the operator has both hands in a tool operating position and well away from any moving parts.

Another object of my invention is to provide filing or finishing apparatus including one or more endless belts and in which adjustable means are provided for adapting the apparatus to operations upon either convexly or concavely curved work surfaces, and which operate on these surfaces even though the surfaces are curved in the same or an opposite manner in directions at right angles to each other.

The foregoing and other objects of my invention are achieved by the provision of power finishing apparatus comprising a plurality of surface finishing means adapted to engage the surface of the work, and means for supporting and driving the surface finishing means in a plurality of counterbalancing directions or paths. More specifically, and in the particular embodiment of my invention illustrated and described, I provide a frame, a pair of endless belts, means mounting the belts in side by side relation with the lower stretch of the belts extending below the surface of the frame, surface finishing means on the outer peripheries of the belts, and means for positively moving the belts in opposite directions. The apparatus may include means for adjustably supporting the inside of the lower stretch of the belts whereby the belts can be made to closely fit and surround a concave or a convex surface or combinations thereof in an object being finished, means functioning to allow the belts to adjust themselves laterally to a concave or a convex surface, and means controlling the slack of the belts.

An important part of my invention is the provision of an endless belt having a rubber body, a load-carrying, substantially-flat, endless ring of rubberized cord embedded in the zero-stress plane of the body, a plurality of longitudinally spaced rubber blocks on the inner periphery of the body, a metal shoe on the surface or each rubber block, and a plurality of file sections each having a length substantially equal to the length of a rubber block and a width at least about as great as the top of the belt, and bolt means securing the file sections to the top of the bolt and extending radially through the belt and secured to the metal shoes, said belt being V-shaped in cross section.

Figure 2:
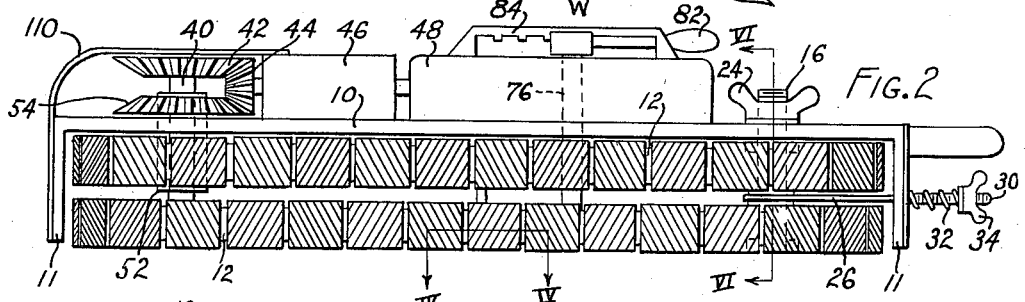
Figure 6:
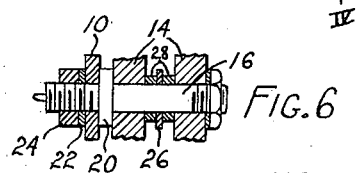
Figure 4:
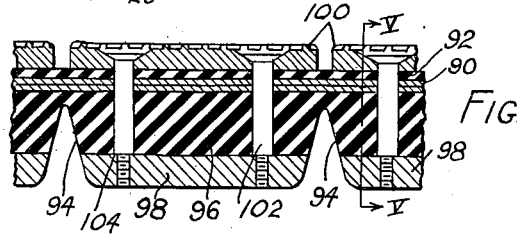
Figure 8:
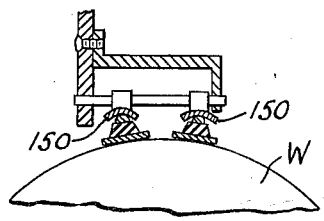
Figure 3:
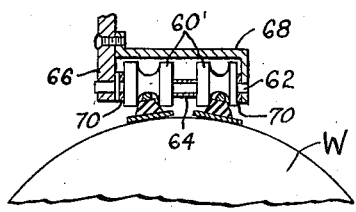
Figures 5, 7:
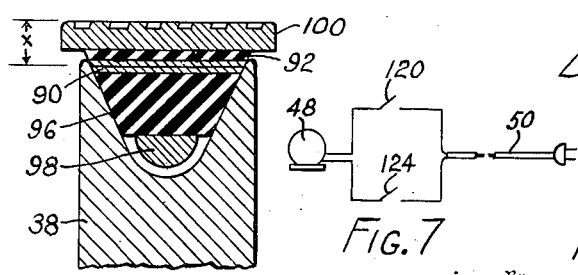

For a better understanding of my invention reference should be had to the drawing wherein Fig. 1 is a side elevation partly in section of one embodiment of my invention with the driving motor and associated parts broken away; Fig. 2 is a bottom plan-view of the apparatus shown in Fig. 1; Fig. 3 is a cross sectional view taken on line III—III of Fig. 1; Fig. 4 is a longitudinal sectional view on an enlarged scale taken on line IV—IV of Fig. 2; Fig. 5 is a transverse cross sectional view taken on line V—V of Fig. 4; Fig. 6 is a transverse sectional view taken on line VI—VI of Fig. 2; Fig. 7 is a schematic wiring diagram illustrating the safety control of my apparatus; and Fig. 8 is a view similar to Fig. 3 but illustrating a modified form of my invention.

It should be particularly understood that the principles of my invention are broadly applicable to finishing operations of substantially all types wherein polishing, cutting, or abrasive means are used against surfaces. However, my invention is most concerned with those finishing operations which include considerable friction, and is specifically concerned with the provision of a power file. Therefore, my invention will be described in conjunction with a power file, and is so illustrated in the accompanying drawing.

One of the advantages of my improved apparatus is that it may be used to finish a surface substantially right up to the line of joinder of the surface with another positioned at an angle, such as a right angle with the first surface. In order to achieve this desired end it is necessary to provide a flat frame which supports the surface finishing belts to one side of the frame in substantially cantilever fashion so that the frame will not strike the work and interfere with a surface finishing operation in an angular corner of the work.

Thus, in the drawing, the numeral 10 indicates a frame of elongated shallow character having end portions 11 formed at right angles to the main body of the frame. The frame is adapted to carry a plurality, such as two, of endless belts 12 so that the lower surface or stretch of the belts are positioned below the lower surface of the frame 10. To this end, a pair of pulleys 14 are journaled on a cantilever shaft 16 preferably adjustably secured at right angles to the frame 10 near one end thereof. The adjustable mounting for the shaft 16 is accomplished, for example, by forming a longitudinal slot 18 in the frame which receives the threaded end of the shaft. A collar 20 fixed to the shaft 16 (see Fig. 6) abuts against the frame and a washer 22 and wing nut 24 carried on the threaded end of the shaft lock the shaft to the frame in any adjusted position. A flat strap 26 formed with an aperture at one end to receive the shaft 16 is positioned between the pulleys 14 by washers 28 and the other end of the strap is secured to a threaded rod 30 which extends out through an aperture in the end 11 of the frame. A spring 32 and a wing nut 34 mounted on the rod 30 provide means whereby the shaft 16 can be adjusted along the frame 10 when the wing nut 24 is loosened to thereby control the amount of slack in the belts 12.

A pair of pulleys 38 are mounted at the other end of the frame 10 and these pulleys serve not only to support the belts 12 but also to drive them. The drive for the belts 12 is achieved by the provision of a cantilver shaft 40 which is journaled in the end of the frame 10 remote from the shaft 16 but parallel thereto. The shaft 40 has a bevel gear 42 secured to one end and the gear engages with a bevel pinion 44 mounted on a shaft extending outwardly from a reduction gear box 46 carried on the frame 10. The reduction gear box 46 is adapted to be connected to a flat, elongated motor 48, which is usually electric, and adapted to be connected to a suitable source of electric current by an extension cord 50. One of the pulleys 38 is secured to the shaft 40, and as best seen in Fig. 2, the shaft 40 rotatably carries a short hollow shaft 52 which carries a pulley 38 at one end and a bevel gear 54 at its other. The bevel gear 54 also engages with the bevel pinion 44, as seen in Fig. 2 so that the belts 12 are driven in opposite or counterbalancing directions.

The stretch of each belt 12 between the pulleys 14 and 38 at the bottom of the apparatus is adjustably supported so as to adapt the apparatus to operations upon either concavely or convexly curved surfaces, as for example, the convexly surfaced work W. One form of supporting means for the stretches of the belts 12 between the pulleys 14 and 38 includes a plurality of grooved rollers 60 which engage with the inner periphery of the belts. See Fig. 3. The rollers 60 are mounted in pairs on a shaft 62 with a spacing collar 64 and six such shafts are used in the embodiment of my invention illustrated, three to each side of the center of the belts. Each three shafts are mounted as a unit with the outer end of the unit pivotally secured to the frame and the inner end of the unit being adjustable vertically. To achieve this result, the end of one shaft of each unit is mounted in a bracket 66 extending downwardly from the frame 10 and the other end of the shaft may be supported by an arm 68 (see Fig. 3) fastened to the frame. This one shaft 62 then serves as a pivotal support for side plates 70 of a sub-frame or unit which carries the two somewhat shorter shafts 62 completing the unit.

The shafts 62 which serve as pivots for each unit are preferably mounted in such a vertical position that when the units carrying the rollers 60 are horizontal the stretch of the belts passing over the rollers is in a plane below any portion of the belts surrounding the pulleys 14 and 38. In this way any tendency for those portions of the belts carried by the pulleys to engage with or gouge the work is largely eliminated.

The inner or swinging ends of the side plates 70 overlap adjacent the center of the apparatus and are connected so as to travel together to thereby move the belts 12 to either a concave, straight or convex form. For example, the side plates 70 of one unit are formed with longitudinally extending slots 72 which slidably receive a pin 74 secured between the side plates 70 of the other unit. In order to move the pin 74 up and down, I journal a shaft 76 in the frame 10 and secure arms 78 thereon which have longitudinal slots 80 which slidably receive the pin 74. A lever 82 secured to the outer end of the shaft 76 controls the angular position of the shaft and thus the position of the pin 74 and the rollers 60. The lever 82 may be held in its adjusted position by the spring of the lever holding it in the selected notch of a notch plate 84 mounted on the side of the apparatus.

An important part of my invention is the provision of an endless flexible file of a particularly practical character. Specifically, the flexible file provided by each belt 12 includes a substantially standard rubber V-belt having one or more layers of rubberized fabric cord or the like which forms a relatively thin endless band 90, (see Figs. 4 and 5) comprising the load-carrying portion of the belt 12 and which is positioned at the medium, or zero-stress plane of the belt. Secured to or surrounding the rubberized load layer 90 is a body of rubber 92 which preferably has its inner periphery notched, as at 94, at circumferentially spaced points so as to provide a plurality of rubber blocks 96 on the inner periphery of the belt.

Each rubber block 96 is formed with a metal shoe 98 which is adapted to engage with and roll on the rollers 60. The metal shoes 98 are of less width than the rubber blocks 96 so that the sides of the pulleys 38 will engage in driving relation with the rubber blocks and the rubber belt rather than with the metal shoes. Fig. 5 illustrates that the belt 12 is of a V-shaped in cross section so that a wedging drive is obtained as will be understood. File sections 100 are secured to the outer periphery of the belts 12. This may be accomplished in a number of ways but it is conveniently done by the provision of shouldered bolts 102 which have heads received in countersunk holes in the file sections and threaded ends screwed into tapped openings in the metal shoes 98. The shoulders 104 on the bolts prevent squeezing and lateral bulging of the belts.

The file sections 100 secured to the outer periphery of the belt 12 are ordinarily made at least about as great as the width of the top of the belt. In the drawing I have shown the width of the file sections to be slightly greater than the width of the top of the belt. The length of each file section 100 is slightly greater than that of the rubber block 96 immediately beneath it. It will be noted that I place the file sections 100 as close together as possible so that any tendency for the corner of a file section to gouge into the work or surface being treated is reduced to a minimum. Also, it should be noted in this connection that making the file section somewhat longer than they are wide is particularly advisable inasmuch as gouging or chattering of the file sections on the work is largely prevented. If the file section is made wider than it is long there is a very definite tendency for the file section to tilt about its forward edge when it engages with the work or any protuberance thereon and the result is a gouging of the work or a chattering of the belt.

I preferably enclose the top of the apparatus with a sheet metal cover 110 and provide handles 112 and 114 for the operator to grip in operating the tool. Brackets 116 and 118 secured to the frame 10 may be provided as added supports for the handles.

Fig. 7 illustrates diagrammatically the safety features incorporated with my apparatus so that the operator cannot use the tool or turn it on accidentally when he has his hands in any position where they might be injured by the operation of the tool. More particularly, I provide a switch 120 having an operating trigger 122 which extends down along the front of the handle 114 so that the switch is closed when the handle is gripped. The switch 120 is connected in series with one of the leads from the extension cord 50 to the motor 48. In addition to the switch 120, I provide a second switch 124 in the other motor lead which switch is associated with the handle 112. In order to close the switch 124 the operator must move the handle 112 from the full line to the dotted line position in Fig. 1. It will be evident that it is necessary for the operator of my apparatus to have one hand on the handle 112 and the other hand on the handle 114 in order to start the motor 48. This safety feature insures that the operator of the apparatus has both hands in tool operating position when the tool is operated and as a result the operator cannot have his hand in any of the moving parts of the apparatus where his hand might be injured.

It is believed that the operation of my improved apparatus will be apparent from the foregoing description. However, briefly reviewing this operation, the extension cord 50 is plugged into a suitable source of electric current, and the operator then grasps the apparatus by the handles 112 and 114 and positions the apparatus over the surface to be filed. For example, my improved apparatus is particularly adapted to smooth the surface of a fender or other similar body during the finishing or repair of an automobile. Specifically, if the convexly curved surface of a fender having a body of solder, paint or the like thereon is to be smoothed the operator places the apparatus on the fender and adjusts the position of the lever 82 so as to adapt the stretch or reach of the belts 12 to most closely follow or approximate the curved surface of the fender, as for example, the work W.

It will be recognized that the rollers 60 and side arms 70 of the sub frames form an inverted V on convex work and an upright V on concave work, as well as being capable of adjustment to a straight line when working on flat work. When the rollers 60 are positioned either as an inverted or an upright V they may not exactly coincide with the smoothly curved surface of the work and hence all of the rollers 60 may not be in positive engagement with the metal shoes 98 of the belts 12 at all times.

However, I have found that this is not undesirable inasmuch as most of the work operated on is convex and the tension on the belts can be adjusted by moving the shaft 16 to or from the end of the frame 10 by adjustment of wing nuts 24 and 34, as above described, to change the tension or slack on the belts 12 and thereby adapt the belts to closely follow the work with the necessary pressure at all times. Often it is unnecessary to change the position of the shaft 16 even when working on surfaces of different curvature because the wedging characteristics of the V-belts 12 in their pulleys compensates for the difference in the surfaces being worked.

From the foregoing it will be recognized that the positioning of the rollers 60 at the proper angle and the adjustment of the shaft 16 adapts the reaches or stretches of the belts 12 to curve around and follows the surface of the work W in a longitudinal direction. But it is important to note in addition that the file sections 100 and the belts 12 are adjustable laterally. This adjustment is best illustrated in Fig. 3 from which it will be seen that the half round metal shoes 98 on the inner periphery of the belts 12 engage in the semi-circular bottoms of the grooved rollers 60 and are free to rock laterally due to the inherent flexibility of the rubber belts. Thus, the file sections 100 when pressed into engagement with a surface to be finished adjust themselves laterally to fit the work regardless of whether it is flat or curved either convexly or concavely. It should be noted that the grooves in the rollers 60 are of such a cross-section contour that they not only allow the lateral tilting of the belts with the bottoms of the grooves supporting the metal shoes of the belts but also the sides of the grooves engage with the sides of the belts to partially support the belts and thereby prevent the metal shoes on the belt from objectionably bumping against the rollers 60.

Once the apparatus is adjusted, which takes only a few seconds in most cases, the operator pushes down the handle 112 and squeezes the trigger 122 on handle 114 to close the switches 120 and 124 and thus start the motor 48 into operation. The motor 48 operating through the gear box 46, bevel pinion 44 and bevel gear 42 and 54 operates to drive the belts 12 in opposite directions. The fact that the belts 12 are driven in opposite directions causes these belts to counteract or counterbalance each other so far as any tendency to move the apparatus off the work is concerned. Also, any tendency for the work to scoot out from under the belts is largely overcome.

Obviously, in the operation of the tool there is a slight tendency for the work or tool to rotate under the turning of the belts. However, this is ordinarily relatively slight and is much less than forces heretofore encountered in an apparatus having a single belt and such rotating force usually can be neglected. However, I particularly contemplate the provision of apparatus having more than two oppositely driven belts and in which any turning torque is completely eliminated.

The operation is continued with or without moving the tool over the work until the desired resurfacing or finishing operation is performed. Obviously, during any period of the operation the lever 82 and shaft 16 can be adjusted to best adapt the apparatus to fit any particular surface contour. Also, the apparatus can be adapted to change the position of the belts 12 so that instead of being positioned concavely and working on a convex surface, the belts are positioned convexly and work on a concave surface. It will be seen that the belts adjust themselves in a lateral direction by rocking on the rollers 60 to a flat, a concave, or a convex surface. As soon as the operator raises the handle 112 or releases the trigger 122 on the handle 114 the motor 48 stops operation and the tool can be lifted from the work. In a similar manner operations upon substantially any type of surface can be performed by my improved apparatus. It should also be noted that the cantilever construction of the apparatus permits it to be used, in most cases, right up to the line of joinder of a fender with the auto body, all as heretofore described.

The modification of my invention shown in Fig. 8 differs from that heretofore described only in that the grooved rollers 60 are replaced with troughs or guides 150 of an inverted V-shape in cross-section. These guides 150 are pivotally mounted at their outer ends and are actuated up or down at their inner overlapping ends by lever 82 and the associated mechanism.

From the foregoing it will be recognized that the objects of my invention have achieved by the provision of an easily-operated, relatively-inexpensive tool for performing filing or finishing operations upon concave or convex surfaces. The apparatus is relatively light in weight and is of a portable nature. Usually, all of the parts which can be are made from aluminum or other light weight material. If desired the apparatus when built in larger form may be suitably counterbalanced or provided with overhead counterweighted supports, all in accordance with known practice on other relatively heavy semi-portable tools. The operation of my improved apparatus is characterized by the absence of chattering or gouging of the work and by a relatively smooth steady flow of effective filing power. A skilled operator is not required and the use of the tool greatly reduce operator fatigue and the cost of filing or finishing operations.

It will be understood that various modifications of my invention can be resorted to without departing from the basic features thereof. For example, instead of employing the metal file sections illustrated in the drawing and herein described I may employ substantially any other type of surface finishing means, such as carborundum blocks, sand paper, emery cloth and polishing, cutting, or abrasive means of a wide variety. Also, I may dispense with one or more of the switches 120 and 124, and may even use only one belt, as for example, where the apparatus is employed as or incorporated in a finishing apparatus of a non-portable nature. I may eliminate the support for the stretches of the belts, although I prefer not to do so. Again, it is not essential that the belts 12 be formed with notches 94. Still again, I may provide a rheostat for controlling the speed of the motor and may mount the motor and remaining parts of the belt drive on the top of the frame. Also, I may retain certain of the advantages of my invention even though the rubber V-belts are replaced by chains, cables or other forms of flexible carriers for the surface finishing means.

An important feature of my invention is the shortening to a minimum of the distance between the surface of the surface finishing means and the line of power application. Specifically, and having reference to Fig. 5, the distance X between the center of the load-carrying layer of cords 90 and the outer surface of the file 100 is relatively short. I have found keeping this distance short and in combination with the other features of my invention that chattering of the surface finishing means on the surface of the work is largely, if not completely, eliminated.

Further, the non-metallic mounting and drive of the surface finishing means, namely, the use of rubber V-belts, as described, eliminates much noise and vibration from the apparatus.

Thus, while in accordance with the patent statutes I have specifically illustrated and described one embodiment of my invention, it should be particularly understood that I am not to be limited thereto or thereby, but that the scope of my invention is defined in the appended claims.

I claim:

1. A power file comprising a frame, a pair of endless rubber V-belts, means mounting the belts in side by side relation with the lower stretches of the belts extending below the frame, a plurality of relatively short pieces of file mounted on the outer peripheries of the belts, means for positively moving the belts in opposite directions, means adjustably supporting the inside of the lower stretches of the belts whereby the belts can be made to closely fit and surround a flat, a concave or a convex surface of an object being filed, and means functioning to allow the belts to tilt and adjust themselves laterally to a flat, a concave or a convex surface.

2. Portable surface finishing apparatus comprising a frame, a pair of endless flexible carriers, means mounting the carriers in side by side relation with the lower stretches thereof extending below the bottom surface of the frame, a plurality of relatively short pieces of surface finishing means mounted on the outer peripheries of the carriers, means for moving the carriers in opposite directions, means whereby the carriers can be made to closely fit and surround a flat, a concave or a convex surface of an object being finished, and means whereby the surface finishing means can tilt and adjust themselves laterally to the surface being finished.

3. Surface finishing apparatus comprising a frame, a pair of endless rubber V-belts, means mounting the belts with the stretches of the belts extending below the bottom surface of the frame, a plurality of relatively short pieces of surface finishing means mounted on the outer peripheries of the belts, means for positively driving the belts in opposite directions, a plurality of relatively short metal means secured to the inner periphery of each belt, and means engaging with the metal means on the inner periphery of each belt to support the inside of the lower stretches of the belts.

4. Surface finishing apparatus comprising a frame, a pair of shafts positioned transversely of opposite ends of the frame, a plurality of pulleys carried by each shaft, a plurality of endless belts, each belt being carried over a pair of aligned pulleys on opposite shafts and serving to mount the belts with the lower stretches thereof extending below the frame, surface finishing means mounted on the outer peripheries of the belts, and means associated with one shaft for positively driving the belts in counterbalancing directions.

5. Surface finishing apparatus comprising a plurality of endless carriers, means rotatably mounting the carriers, surface finishing means associated with the outer peripheries of the carriers, means including an electric motor for positively rotating the carriers in counterbalancing directions, a pair of handles on the apparatus, and motor switch means associated with each handle so that the apparatus cannot be operated until each handle is gripped.

6. Surface finishing apparatus comprising a frame, a plurality of endless carriers, means mounting the carriers with certain stretches thereof extending outside of the frame, surface finishing means associated with the outer peripheries of the carriers, means for positively rotating the carriers in counterbalancing directions, a pair of oppositely extending frame means pivoted at their outer ends directly to the frame and supporting the inside of the stretches of the carriers, and lever means engaging with the inner ends of the frame means for simultaneously adjusting the angular relation of the frame means and the frame whereby the carriers can be made to closely fit and surround the surface of an object being finished.

7. Surface finishing apparatus comprising a frame, a plurality of endless carriers, means mounting the carriers with certain stretches thereof extending outside of the frame, surface finishing means associated with the outer peripheries of the carriers, means for positively driving the carriers in counterbalancing directions, rotatable supporting means adapted to engage with the inside of the stretches of the carriers extending outside the frame, and means on the rotatable supporting means and on the carriers providing a dot contact therebetween whereby the carriers can tilt and adjust themselves laterally to a concave or a convex surface.

8. A power finishing tool comprising a frame, a pair of endless rubber V-belts, means mounting the belts so that the planes thereof are in juxtaposed parallel relation and with the lower stretch of the belts extending below the bottom surface of the frame, a plurality of relatively short pieces of surface finishing means having a greater length than width mounted on the outer peripheries of the belts, means mounted on the frame and including an electric motor and a reduction gear box for positively moving the belts in opposite directions, means including adjustably positioned guides adjustably supporting the inside of the lower stretches of the belts whereby the belts can be made to closely fit and surround a concave or a convex surface of an object being finished, said guides functioning to allow the belts to tilt and adjust themselves laterally to a concave or a convex surface, a pair of spaced handles on the frame for picking up and guiding the tool, and electric switches associated with the handles for turning on the electric current to the motor only when the operator is grasping both handles.

9. A power finishing tool comprising a frame, a plurality of endless rubber V-belts, means mounting the belts on one side of the frame so that the frame does not interfere with the operation of the belts up to the line of joinder of one surface with another at an angle thereto, a plurality of relatively short pieces of surface finishing means having a greater length than width mounted on the outer peripheries of the belts, means mounted on the frame for positively moving the belts in counterbalancing directions, and means including adjustably positioned guides adjustably supporting the inside of the lower stretches of the belts whereby the belts can be made to closely fit and surround a concave or a convex surface of an object being finished, said guides functioning to allow the belts to tilt and adjust themselves laterally to a concave or a convex surface.

10. In combination, surface finishing means adapted to perform work on a surface, means for effecting relative movement between the surface of the work and the surface finishing means, means for positioning the surface finishing means in an adjustably curved path in the direction of relative movement, and grooved rotatable means supporting the surface finishing means for rocking movement about and against the bottom of the groove of the supporting means in a direction substantially at right angles to the direction of relative movement.

11. In combination, flexible endless surface finishing means adapted to perform work on a surface, means for effecting relative movement between the surface of the work and the surface finishing means, and means engaging with the side of the surface finishing means opposite the surface finishing surface for supporting only a flexible stretch of the surface finishing means for tilting movement about and against the supporting means in a direction substantially at right angles to the direction of relative movement.

12. In combination, an endless flexible V-belt, surface finishing means carried on the outer periphery of the V-belt, a pair of pulleys supporting the V-belt, means for driving at least one of the pulleys, a plurality of relatively short metal shoes secured to the inner periphery of the V-belt, guides supporting one of the stretches of the V-belt between the pulleys and engaging with the metal shoes, said guides and shoes being shaped so that the V-belt in the supported stretch can tilt laterally, and means adjustably supporting and positioning the guides so that the stretch of the V-belt can be longitudinally curved concavely.

13. Surface finishing apparatus including an endless belt having a rubber body, a load-carrying, substantially-flat, endless ring of rubberized, substantially-stretchless material embedded in the zero-stress plane of the body, a plurality of longitudinally-spaced, but closely adjacent rubber blocks on the inner periphery of the body, a metal shoe on the inner surface of each rubber block, a plurality of surface finishing means each having a length substantially equal to the length of a rubber block and width at least about as great as the top of the belt secured to the top of the belt, said belt being V-shaped in cross-section.

14. Surface finishing apparatus including a plurality of surface finishing means, endless means flexibly connecting the surface finishing means, means mounting the flexible connecting means so that the surface finishing means move in endless directions, metal means carried by the inner periphery of the flexible connecting means, means for driving the flexible connecting means, and grooved metal means having the groove thereof engaging with the metal means carried by the inner periphery of a stretch of the flexible connecting means and so that the metal means has rocking support in the grooved metal means whereby the surface finishing means can tilt laterally during a surface finishing operation.

15. Surface finishing apparatus including a plurality of metal file sections, a rubber V-belt supporting the file sections substantially in end to end relation, means mounting the V-belt so that the file sections move in endless directions, means for driving the V-belt, and means pivotally supporting the file sections for lateral tilting movement about axes substantially parallel to the direction of driven movement of the file sections.

16. In combination, an endless flexible V-belt, surface finishing means carried on the outer periphery of the V-belt, a pair of pulleys supporting the V-belt, means for driving at least one of the pulleys, a plurality of relatively short metal shoes secured to the inner periphery of the V-belt, and guides supporting one of the stretches of the V-belt between the pulleys and engaging with the metal shoes, said guides and shoes being shaped so that the V-belt in the supported stretch can tilt laterally.

17. Surface finishing apparatus including an endless belt having a rubber body of V-shape, a load-carrying, substantially-flat, endless ring of rubberized, substantially-stretchless material embedded in the zero-stress plane of the body, a plurality of metal shoes mounted in substantially end to end relation on the inner periphery of the belt, and a plurality of surface finishing means each substantially equal in length to a metal shoe mounted substantially in end to end relation on the outer periphery of the belt at points opposite to the shoes.

FAYE P. STULL.